Figure 1:
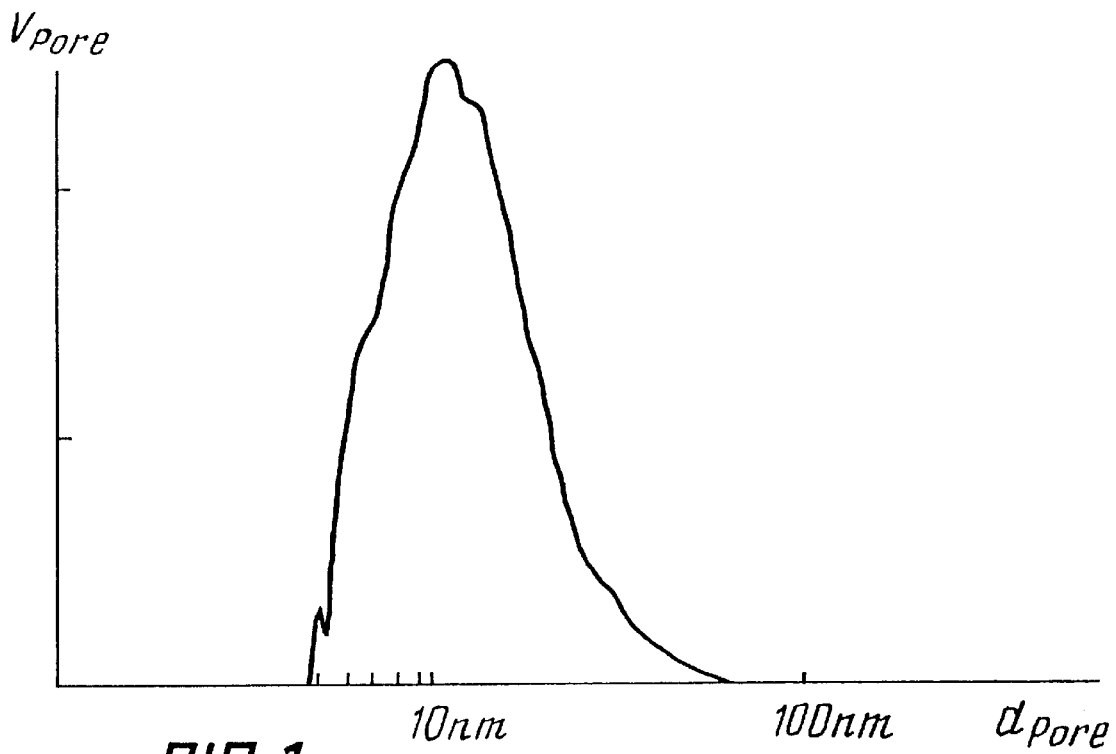

United States Patent [19]

Vereschagin et al.

[11] Patent Number: 5,861,349

[45] Date of Patent: Jan. 19, 1999

[54] SYNTHETIC DIAMOND-CONTAINING MATERIAL AND METHOD OF OBTAINING IT

[75] Inventors: Alexandr Leonidovich Vereschagin; Evgeny Anatolievich Petrov; Gennady Viktorovich Sakovich; Vitaly Fedorovich Komarov, all of Biisk; Anatoly Valentinovich Klimov, Altaisky krai; Nikolai Vladimirovich Kozyrev, Biisk, all of Russian Federation

[73] Assignee: Nauchno-Proizvodstvennoe Obiedinenie "Altai", Biisk, Ulitsa Sotsialisticheskaya, Russian Federation

[21] Appl. No.: 108,568

[22] PCT Filed: Dec. 3, 1992

[86] PCT No.: PCT/RU92/00225

§ 371 Date: Nov. 18, 1993

§ 102(e) Date: Nov. 18, 1993

[87] PCT Pub. No.: WO93/13016

PCT Pub. Date: Jul. 8, 1993

[30] Foreign Application Priority Data

Dec. 25, 1991 [RU] Russian Federation ............... 5016083

[51] Int. Cl.$^6$ .................................................. C01B 31/06
[52] U.S. Cl. ............................................ 501/86; 423/446
[58] Field of Search .................... 423/446; 156/DIG. 68; 264/84; 428/408; 501/86

[56] References Cited

U.S. PATENT DOCUMENTS

| 3,749,760 | 7/1973 | Deryagin | 423/446 |
| 4,377,565 | 3/1983 | Setaka | 423/446 |
| 4,483,836 | 11/1984 | Adadurov et al. | 423/446 |
| 4,617,181 | 10/1986 | Yazu et al. | 423/446 |

FOREIGN PATENT DOCUMENTS

| 2479174 | 2/1981 | France . | |
| 072655 | 3/1990 | Japan . | |
| 271109 | 12/1991 | Japan | 423/446 |
| 1687761 | 10/1991 | U.S.S.R. . | |
| 1154633 | 6/1969 | United Kingdom . | |

OTHER PUBLICATIONS

Savvakin, G. I. et al. "Possibilities of Phase . . . " Proceedings of the USSR Academy of Sciences, vol. 282, No. 5, 1985. Nauka Publishers pp. 1128–1131.

Volkov, K. V. et al. "Synthesis of Diamond . . . " The Physics of Combustion and Explosion. 1990, pp. 1128–1131.

Staver, A.M. "Ultradispersive Diamond . . . " The Physics of Combustion and Explosion 1984, pp. 100–104.

Adaurov, G. A. et al. "Diamonds Obtained Obtained . . . " The Physics of Pulse Pressures Proceedings, Research Institute of Physical and Radio Engineering Measurements, Moscow, 1979, pp. 157–161.

Properties of . . . Synthesis: A.L. Vereschagin et al: 1993: pp. 160–162, no month.

Soot Derived . . . Charge: vol. 22: No. 2, pp. 189–191, 1984, no month.

Nature: Diamonds in . . . Soot: N.Roy Greiner et al: vol. 333, 2 Jun. 1988: pp. 22–25.

Journal of Applied Physics: vol. 62: 1 Sep. 1987: pp. 1553–2159: Mathias Van Thiel et al.

Diamond & Related Materials: vol. 1, No. 1, Aug. 15, 1991: pp. 3–7B.

The Journal of Organic Chemistry: vol. 50: Dec. 27, 1985: No. 26: pp. 8–9A.

Primary Examiner—Gary P. Straub
Assistant Examiner—Stuart L. Hendrickson
Attorney, Agent, or Firm—Ladas & Parry

[57] ABSTRACT

A diamond-containing material having the following element content ratio in per cent by weight: carbon 75–90, hydrogen 0.6–1.5, nitrogen 1.0–4.5, oxygen the balance, the following phase content ratio in per cent by weight: roentgen amorphous diamond-like phase 10–30, diamond of cubic modification the balance, and having a porous structure. 10–20% of the surface of the material consists of methyl, nitryl and hydroxyl groups of two types, as well as functional oxycarbonic groups of the general formula O=R where R represents =COH, =COOH, =CO, =$C_6H_4O$ or any of their combinations, and 1–2% of the surface constits of carbon atoms with non-compensated links. A method for obtaining said material consists in detonation of a carbon-containing explosive substance with negative oxygen balance, or a mixture of explosive substances, in a closed volume in the atmosphere of gases inert to carbon, with an oxygen content of 0.1–6.0% by volume, at a temperature of 303–363 K and in the presence of ultradispersed carbon phase with concentration of 0.01–0.15 kg/m.

7 Claims, 2 Drawing Sheets

1

SYNTHETIC DIAMOND-CONTAINING MATERIAL AND METHOD OF OBTAINING IT

FIELD OF THE INVENTION

The present invention relates to the field of inorganic chemistry of carbon, and more specifically, to the cubic modification of carbon featuring the properties of a superhard material, and to the process for preparing the material which comprises detonation synthesis of a diamond-bearing burden with subsequent extraction by chemical methods.

When some explosives detonate under the conditions making it possible to preserve the condensed carbon products of the explosion ultradispersive diamond-bearing powders are formed, which possess such specific properties as high dispersivity, presence of defects of carbon structure, developed active surface. These characteristics are varied within wide limits depending on the conditions of preparing the diamond-bearing materials. The particular properties of the diamond-bearing detonation materials define the spheres of the practical application, such as in composite materials and coatings, abrasive or lubricating compositiosn and the like.

BACKGROUND ART

The properties of diamond-bearing materials, obtained with the use of explosion energy, and also the conditions of their synthesis and separation from impurities are known in the art.

A paper (G. A. Adadurov et al, "The physics of Pulse Pressures" pp 44 (74), 1979, No. 4, Papers of All-Union Science-Research Institute of Physical and Radio Engineering Measurements, p. 157) discloses the characteristics of the product obtained in detonation of a mixture of RDX with a carbon material (black or graphite) in a blasting chamber in inert atmosphere. The purified product is a powder with the average particle size 0.05 to 5.0 mom, the average particle size calculated for the unit surface values is 0.04 to 0.08 mcm. The unit surface area is 20 to 42 $m^2/g$. The pycnometric density is 3.20 to 3.40 $g/cm^3$. By the phase composition, the product is a mixture of diamond of a cubic (the lattice parameter a=0.357 nm) and a hexagonal modification (lonsdalite). The size of the coherent scattering region (CSR) of crystallites (i.e. the linear distance between the adjacent defects) is 10 to 12 nm, and the value of microdistortions of the second kind, characterizing the presence of defects, is within the limits 1 to $2 \cdot 10^{-3}$. After anealing at 1073 K, the size of CSR was 12 nm, and the value of microdistortions of the second kind was reduced to $0.35 \cdot 10^{-3}$. The temperature of the beginning of graphitization is over 1073K. About one fourth of the surface is occupied by carboxyl groups. When heated in vacuum, specimens lose some. 8% of the mass owing to liberation of oxygen, carbon monoxide and carbon dioxide molecules.

The properties of the diamond obtained from the carbon of explosives are described by K. V. Volkov with co-authors (The Physics of Compution and Explosion, v. 26, No. 3, p, 123, 1990). Synthesis is effected when charges are set off in a blasting chamber in the atmosphere of carbon dioxide and in a water jacket. The particle size of the obtained diamond is 0.3 to 0.06 nm, the CSR size is 4 to 6 nm, the particle shape is round. The pyonometric density is 3.2 $g/cm^3$. The product contains about 90% diamond, the balance, adsorbed gases. The product start oxidizing at 623 K. After fivehour holding at. 1173K, the degree of graphitization of the diamond is 10%.

Other versions of the method (A. M. Staver et al, The Physics of Combusion and Explosion, V. 20, No. 5, p. 100, 1984 and G. I. Savvakin et al, Proceedings of the USSR Academy of Sciences, V. 282, No. 5, 1985) are based of other or the same explosives in various kinds of atmospheres. The products resulting in this case feature properties similar to those described by K. V. Vollcov with co-authors.

For isolating the end diamond-bearing product, use is made of a complex of chemical operations directed at either dissolving or gasifying the impurities present in the material. The impurities, as a rule, are of the two kinds: non-carbon (metal, oxides, salts, etc.) and nondiamond forms of carbon (graphite, black, amorphous carbon).

The diamond-bearing material most close by the technical properties to the material of the present invention is that disclosed in British Patent No. 1154633.

According to this reference, the material is obtained by impact reduction of graphite. The resulting primary product of the synthesis contains, as a rule, less than 15% diamond of the total amount of carbon and a considerable quantity or inorganic impurities.

The purified diamond-bearing material consists of individual diamond particles having the average diameter no more than 0.1 mkm, the unit surface area from 40 to 400 $m^2/g$, hydroxyl, carboxyl and carbonyl groups comprise from 10 to 30% of the surface area. The diamond particles feature no external crystalline cut. Individual diamond crystallites;

feature wide spread over the diameter: $7 \cdot 10^{-4}$ to $1 \cdot 10^{-2}$ mcm (7 to 100 A). The material contains 87 to 92% by mass carbon, in addition it contains 0.1 to 2.0% hydrogen, 0.1 to 2.5% nitrogen and up to 10% oxygen.

When heating from 1123 to 1273 K for four hours in an inert atmosphere, the material loses no more than 5% of the mass in the form of carbon monoxide, carbon dioxide, water and hydrogen. From the results of radiographic analysis, the material contains only carbon, possible impurities of graphite do not exceed 0.2%, inorganic impurities neither exceed 0.2%.

The diamond-bearing material features abrasive and specific adsorption properties, which made it possible to surmise its application in polishing hard materials, strengthening metal coatings, and also in chromatography.

Thus, the references disclosing the know diamond-bearing materials synthesized with the use of the energy of explosion decomposition of explosives and also the specific processes for obtaining these materials fail to disclose the technical solutions to the problem which would make the basis for the effective, economically efficient and ecologically safe technology of industrial production of a diamond-bearing material with the present combination of properties.

DISCLOSURE OF THE INVENTION

The invention is based on the problem of producing a diamond-bearing material with the preset combination of properties, featuring, due to this, a universal capacity of being included in various composite materials and coatings and being obtained following a simple process characterized by safety, reliability, improved technical, economical and ecological parameters and making it possible to organize, on its basis, large-scale industrial production of the diamond-bearing material of the present invention.

This problem is solved by that the material of the present invention is a man-made diamond-bearing material consisting of the aggregates of particles of a round or irregular shape, with the average diameter not exceeding 0.1 mcm, and part of the material surface containing functional groups, said material being characterized by the following elemental composition (% by mass):

| | |
|---|---|
| carbon | 75 to 90 |
| hydrogen | 0.6 to 1.5 |
| nitrogen | 1.0 to 4.5 |
| oxygen | the balance, | by a porous structure, by the following phase composition (mass %):

roentgenoamorphous diamond-like phase 10 to 30 diamond of cubic modification the balance 10 to 20% of the material surface being methyl, nitrile, hydroxy groups of two kinds, and also oxycarboxylic functional groups of the general formula O=R, where R is =COH, =COOH, =CO, =C$_6$H$_4$ or any mixtures thereof, besides, 1 to 2% of the material surface being occupied by carbon atoms with uncompensated bonds. Crystal lattice parameter is 0.3562±0.0004 nm. The ash content is 0.1 to 5.0% by mass. The ash content in the product is conditioned by the presence of inorganic impurities due to the specific features of the method of producing the diamond-bearing substance, and also conditioned by the presence of ferric oxides and carbides, copper and nickel salts, calcium and silicon compounds, which fact is by no means an obstacle in using the material of the present invention in the above-mentioned fields of application.

The stated problem is also solved by that the diamond-bearing material of the invention is obtained by detonating a carbon-containing, explosive with a negative oxygen balance in a closed space in inert (to carbon) gases with the content of oxygen 0.1 to 6.0% by volume at the temperature 303 to 363 K in the presence of are unltradispersive carbon phase (carbon condesate) with the concentration 0.01 to 0.15 kg/m$^3$, with the use of the apparatuses developed by the applicant.

The diamond-bearing material of the invention is a light-grey to dark-grey powder with the average particle size 0.02 to 0.1 mcm, preferably no more than 0.05 mom, determined by the sedimentation method. The particles feature a characteristic porous structure investigated by the nitrogen adsorption and desorption isotherms at 77.5 K. The specimens were preheated in vacuum at 300 K.

The total volume of pores in the powders of the diamond-bearing material of the invention is 0.6 to 1.0 cm$^3$/g, mainly 0.7 to 0.9 cm$^3$/g. Size distribution of the pores in shown in FIG. 1; the average diameter of the pores calculated by Dollimore-Hill algorithm is 7.5 to 12.5 nm,: mainly 8 to 10 nm. The specific porous structure of the material particles is formed owing to the condition of synthesis.

The unit surface area determined by Brunauer-Emmet-Teller isotherms from the thermal desorption of argon is in the range from 200 to 450 m$^2$/g.

The particle size is within the limits 1 to 10 nm, mainly 4 to 7 nm.

Electron-microscopic investigations have shown that the aggregates of particles consist of individual grains of a round or irregular shape of 2 to 10-nm diameter. Crystal faces have not been found on the surface of the particles.

The average size of coherent scattering regions calculated by the method of the fourth moments from the reflection profile (220) amounted to 2 to 10 nm, mainly 4 to 7 nm, which is close to the size of diamond particles, determined from adsorption data. Concurrent with this, the value of microdistortions of second kind was calculated from the analysis of profile line (220), which was measured as Δ a/a, where Δ a is the mean deviation of the crystal lattice parameter. For the specimens of the material of the present invention, this value is 0.01 which is by an order of magnitude greater than for other known forms of detonation diamonds. The value of microstresses in GPa was calculated from the formula:

$$\sigma = \Delta a/aE$$

where E is Young's modulus equal to 1000 GPa.

It follows that the particles are compressed by a pressure of 10 GPa. The crystal lattice parameter of the claimed material was calculated from the analysis of reflection (220) using cobalt radiation. For this, the position of the center of gravity of the line was found. It was revealed that the crystal lattice parameter of the material of the present invention is 0.3562±0.0004 nm, whereas in the rest of the diamond varieties it is 0.3567 nm. The revealed highly deformed condition of the crystal lattice is thermally stable up to the temperature of the beginning of graphitization, which was not observed before in any type of diamond obtained using the energy of explosion. This results from that the forces of surface tension of the particles compress the crystal lattice owing to their ultradispersive condition. Thus, the compressed highly deformed crystal lattice is specific only for the diamond-bearing material claimed and, among other things, define the unique combination of its properties.

Figure 2:
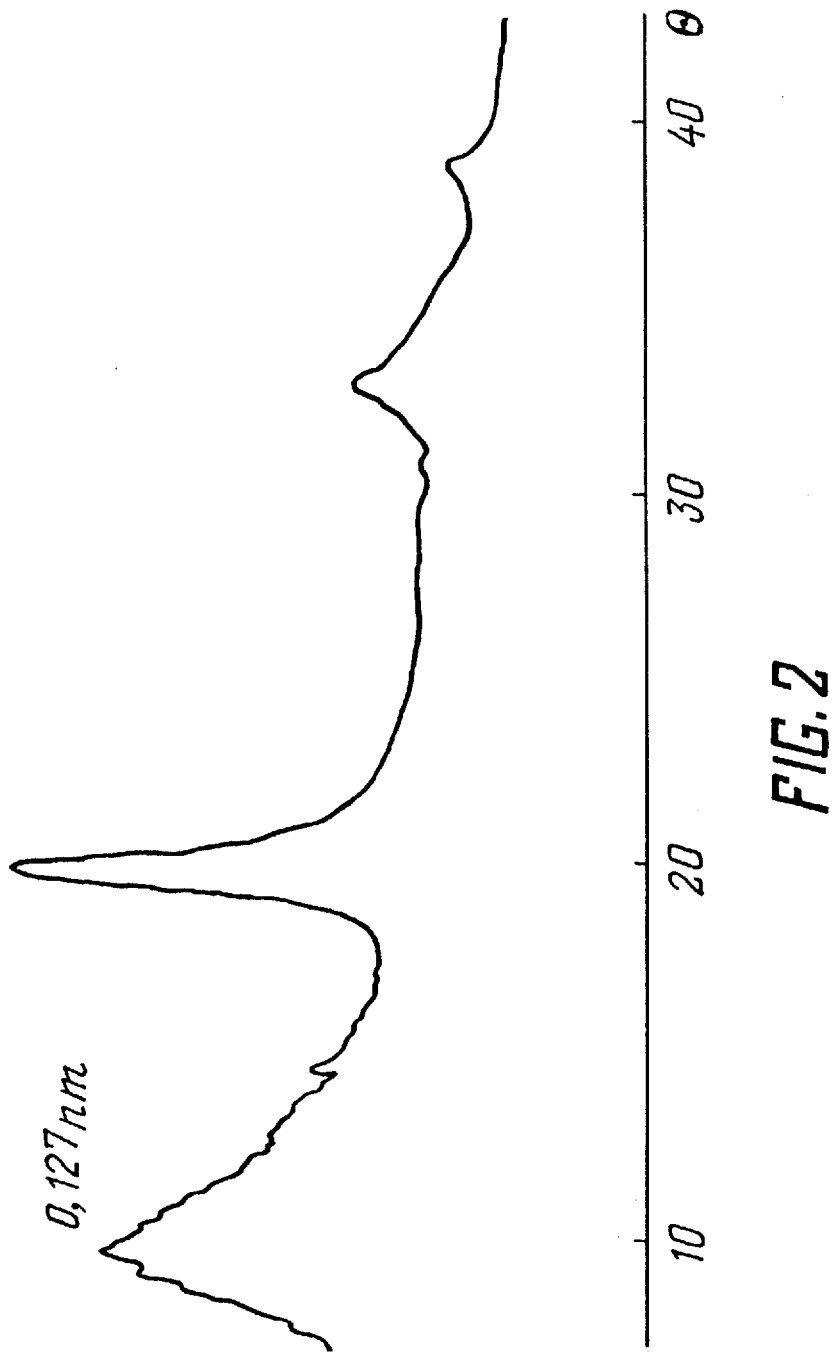

According to the X-ray pattern (FIG. 2), the material claimed contains the diamond of a cubic modification and a roentgenoamorphous phase (the reflection region corresponding to d=0.127 nm). The amount of the amorphous phase was estimated by the decrease in the intensity of reflection (220) of the cubic diamond as against the specimen containing pure cubic diamond. The value obtained is 10 to 30% by mass.

Figure 3:
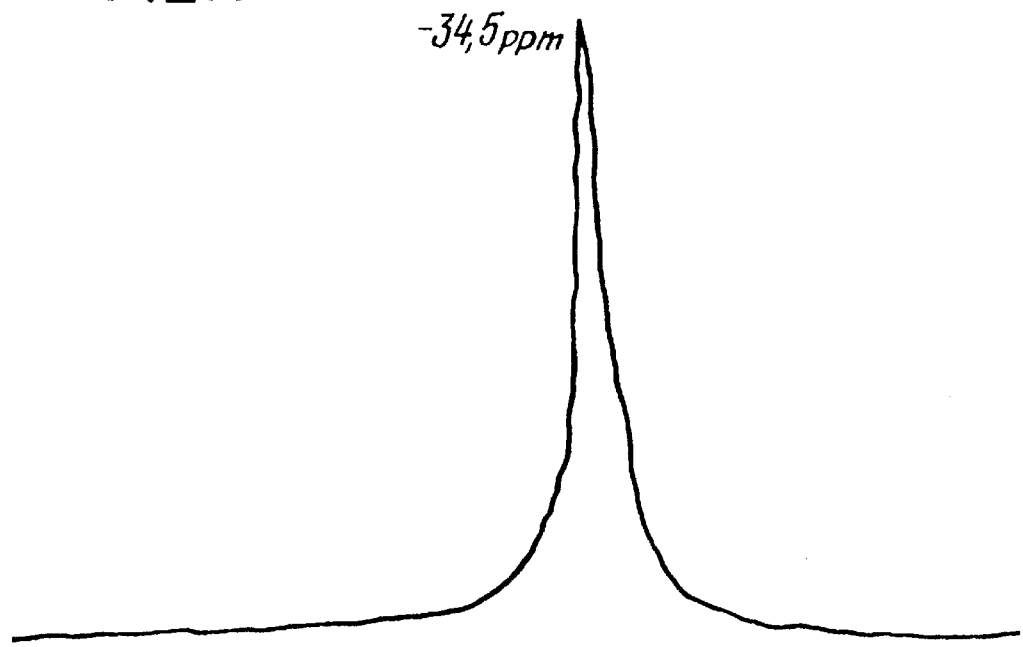

Combination of the diamond cubic and amorphous phases is specific for the diamond-bearing material of the present invention and is the result of its claster organization. The roentgenoamorphous phase contains no graphite. This is proved by the studies of the specimens of the material using the method of nuclear magnetic resonance and X-ray photoelectron spectroscopy. Thus, in the NMR spectrum C13 (FIG. 3), there is present only one line with a chemical shift of −34.5 parts by million (ppm), characteristic of the diamond phase. The X-ray photoelectron spectrum of carbon in C T s region has the absorption band in the region of 286 eV, after bombardment of the specimen with argon ions its surface being charged to the value of 3.3 eV, which testifies to the dielectric properties of the surface carbon structures. In the presence of conductive modifications of carbon (graphite), charging of the surface would not be observed.

Thus, the amorphous phase is close, by the nature of the chemical bonds, to cubic diamond and is an extremely disordered and defect-saturated periphery of diamond clasters.

The presence of the amorphous phase defines an increased reactivity of the claimed material as compared with other man-made diamonds. This shows up in the following reactions. Thus, the temperature of the beginning of oxidation in the air of the diamond-bearing material of the invention, measured at the heating rate 10 degree/min, is 703 to 723 K, whereas for man-made diamonds it is 843 to 923 W. In addition, when heating specimens of the claimed material at a temperature of 443 to 753 K in carbon dioxide at atmospheric pressure, its adsorption takes place, causing an increase in the specimen mass by around 5%, which was not observed before for any of the forms of man-made diamonds.

Practically, increased activity of the material of the present invention manifests itself in compaction processes. In particular, in hot pressing the powders of the present material, strong lowporosity compacts are obtained at the temperatures by 100 to 500 degrees lower than it is adopted in sintering other diamond powders. From the data of radiographic studies, the compacted specimen lacks the amorphous phase, and the intensity of reflections in the cubic diamond increases. It seems that just the amorphous phase, featuring a labile structure, is the activator of sintering diamond grains under comparatively mild conditions.

The carbon atoms with uncompensated bonds present on the surface of the material specimens also stipulate their affinity to molecular nitrogen. As a result of this, the material specimens, after holding in the air or in nitrogen, chemisorb nitrogen with the formation of nitrile groups.

Ultradispersive condition of the material of the present invention contributes to its energy characteristics. Thus, the enthalpy of its formation, determined from the heat of combustion, amounts to 2563 to 2959 kJ/kg, whereas for the natural diamond its value is 209.16 kJ/kg. Such energy capacity is defined by the contribution of the surface energy of the diamond-bearing material of the present invention. So, high energy saturation is specific to the claimed diamond-bearing material.

As distinct from the cited prior-art publications that disclose oxygen-containing functional groups (carboxyl, hydroxyl, carbonyl and others) directly linked with the surface atoms of the diamond crystallites, the diamond-bearing material of the invention, featuring inhomogeneous phase composition, is characterized by a specific way of surface relaxation. In our case, the oxygen-containing functional groups are, as a rule, derivatives of more diverse surface carbon structures, aliphatic, alicyclic and aromatic included.

The qualitative and quantitative composition of the surface functional groups was determined using several analysis methods.

Studying the gases evolved in thermodesorption of the claimed material, liberation of carbon oxides, hydrogen, hydrogen cyanide and methane was observed. Based on these data, it was calculated that the quantity of the surface carbon atoms comprises no less than 2% of the total number. In studying the IR-spectrum of absorption of specimens, the absorption bands were revealed characteristic of carbonyl =CO, carboxyl =COOH, hydroxyl —OH and methyl $CH_3$-groups. In the analysis of the spectrum of proton magnetic resonance, it was found that two varieties of hydroxyl groups differing in the value of the chemical shift were observed. It is supposed that one of these varieties ire isolated groups and the other and interacting groups. In conducting polarographic investigation, there were identified lactone =COOCO—, quinone O=$C_6H_4$=O and hydroperoxide =COOOH groups. The total amount of oxygen-containing surface groups was determined from the reaction of metal potassium, as it is recited in British Patent No. 1154633, and it amounted from 10 to 20% of the specimen surface.

The surface of the material is thus a wide spectrum of both functional groups, mainly oxygen-containing, and carbon structures to which these groups are directly linked and which influence, to a considerable extent, the chemical properties and reactivity of the surface. This opens up greater possibilities to conduct various chemical reactions on the surface the claimed diamond-bearing material than are those issuing from the description of the surface properties of the known materials.

Thus, the diamond-bearing material of the present invention features the following advantages as compared with the material of British Patent No. 1154633 which is the closest prior-art material, the advantages making it possible to use it most effectively in producing composite materials:

1. Porous structure of the aggregates of diamond particles with the volume of the pores from 0.6 to 1.0 $cm^3$/g and pore diameter 7.5 to 12.5 nm which permits of using lees mass of the claimed material with the same volume proportion of the diamond-bearing material as against that of the prior-art material.

2. The presence of the amorphous-phase up to 30% by mass, which facilitates the conditions of compaction of composite materials.

3. The presence of a wide spectrum of functional derivatives on the surface with the result that the claimed material can be used for a wide range of composite compositions without preliminary modification of the surface.

It is to be noted that the new characteristics of the substance are stipulated by 1he method of preparing thereof. As distinct from the closest prior art, where the diamond-bearing material is obtained by impact loading of graphite, the material of the invention is obtained in detonation decomposition of explosives, that is, the material is not the product of recrystallization of one allotrope form of carbon to another, but the product of carbon condensation through plasma (gas) and, propably, liquid into a solid with a specific crystal structure, chemical composition and properties.

Moreover, the diamond-bearing material of the present invention is obtained by detonation in a blasting chamber of carbon-containing explosive with a negative oxygen balance, with the following requisite conditions being observed:

(a) the chamber temperature at detonation is 303 to 363 K,
(b) the oxygen content in the chamber is 0.1 to 6.0% by volume,
(c) the presence in the chamber of suspended ultradispersive particles with the concentration 0.01 to 0.15 $kg/m^3$.

These conditions ensure.

(a) formation of a diamond cubic phase with the size of undisturbed crystal blocks 1 to 10 nm,
(b) condensation of a definite amount of carbon in the form of a diamond-like roentgenoamorphous phase,
(c) formation of an ordered superstructure of the diamond, diamond-like and other highly dispersive carbon phases, the reactive peripheral formations included,
(d) inclusion in the condensed diamond-bearing carbon material at the synthesis stage of a certain proportion of non-carbon (inorganic) additives.

The presence of oxygen in the blasting chamber atmosphere in the amount 0.1 to 6.0% by volume ensures a complex macrokinetic balance between the processes of surface and volumetric oxidation of carbon. This, in turn, forms, at the synthesis stage, the basis of the specific porous structure of the claimed diamond-bearing material. The rate of gasification is known to be restricted in active media by the reverse diffusion of the reaction products. In the set of the above-listed conditions of synthesis, the above-mentioned content of oxygen in combination with a definite concentration of carbon condensed phase makes it possible to block, to a considerable degree, the surface of carbon. This favours its preservation on the condition that the oxygen concentration does not exceed 8% by volume. At the same time, development of topochemical reactions of oxidation of non-diamond carbon in the reflected impact waves owing to the catalytic influence of the above-mentioned non-carbon additives is possible, which results in the destruction of the originally ordered carbon structures, in the partial graphitization and amorphization of diamond particles, in the development of defects in the diamond macrocrystallites.

In the suspension of ultradispersive carbon particles in the synthesis atmosphere, the carbon particles serve as the centers of crystallization of the diamond particles and they scatter the energy of explosion because if they are absent the output of the condensed products of explosion in the oxygen-containing atmosphere is reduced. Because of instability of the suspension, concentrations greater than 0.15 kg/m$^3$ cannot be achieved despite the ultradispersive condition of carbon.

Given below are examples illustrating the influence of the conditions of synthesis on the properties of the diamond-bearing material obtained.

EXAMPLE 1

Placed in the center of a blasting chamber, commonly used in explosion technologies, of 2 m$^3$ volume is a charge of an explosive, such as trotyl/hexogen (cyclotrimethylenetrinitramine ("RDX")) 60/40 of 0.5-kg with an electric detonator in an atmosphere containing 4 vol. % oxygen (the balance is nitrogen), and 0.1 kg/m$^3$ ultradispersive carbon particles at the atmosphere temperature 303K. The chamber is closed and the charge is blasted. After ten minutes holding, the chamber is opened and powder is taken off the chamber walls. Then the powder is sieved through a screen with a mesh size of 160 mcm, is placed in a glass and boiled with 200 ml of 468 hydrochloric acid for dissolving metal impurities. For removing oxidized and non-diamond forms of carbon, the product is additionally treated with a mixture of concentrated nitric and sulfuric acids at a temperature of 523 K for 2 hours. Then the product is washed with distilled water from the acids till pH aqueous extract equal to 7 and is dries in the air at a temperature of 423 K for four hours. In studying the powder, the following data are obtained.

a dark-grey powder has a picnometric density of 3.1 g/cm$^3$, the surface unit area being 285 m$^2$/g. The average particle diameter of the specimen, calculated on the basis of the above data, is 6.6 nm.

By the data of radiographic investigation, the product consists of two phases: a cubic carbon phase (diamond) (75%) and its amorphous pahse (25%).

The cubic lattice parameter measured by cobalt radiation from the profile of reflection (220) is 0.3563 nm.

Studies into the elemental composition gave the following results: (C) is 88.5%, (N) is 2.2%, (H) is 1.1%, (O) is 8.2%. The yield (Y) of the end product comprises 3.5% of the explosive and the content of diamond in the condensed products of explosion (C) is 55.4%. The ash content (Z) is 2.1%, the pore volume (V$_{pore}$) is 0.7 cm$^3$/g, the average diameter (d$_{pore}$) is 8.4 nm.

The composition of the surface oxygen-containing functional groups is determined polarographically. Quinone, lactone, carbonyl, carboxyl and hydrogen peroxide groups are identified by the value of reduction potential. Nitrile and methyl groups are identified by the composition of gases evolved in heating. Hydroxyl groups are determined from the data of IR-spectroscopy.

Other examples of conducting the process with the claimed ranges of the method parameters are tabulated in Table 1 (hydroxyl, lactone, carbonyl, carboxyl, hydroperoxide, nitrile, methyl groups and surface carbon atoms with uncompensated links have been found in all the specimens prepared by the process according to the present invention).

The table also includes comprative examples with the method conditions different from those claimed, for a graphic comparison with the properties of the obtained products.

TABLE 1

| Example No. 1 | Explosive 2 | Chamber t, K at detonation 3 | Content of oxygen vol. % (inert gas the balance) 4 | Concentration of suspended particles, C, kg/m$^3$ 5 | The properties of the product obtained 6 |
|---|---|---|---|---|---|
| 1 | Trotyl /RDX 60/40 | 303 | 4.0 | 0.1 | (C) = 88.55% <br> (H) = 1.1% <br> (N) = 2.2% <br> (O) = 8.2% <br> (Z) = 2.1% <br> (B) = 3.5% <br> (C) = 55.4% <br> a = 0.3563 nm <br> CRS = 6.6 nm <br> S = 285 m$^2$/g <br> V$_{pore}$ = 0.7 cm$^3$/g <br> d$_{pore}$ = 8.4 nm <br> 25% of amorphous phase and 75% of diamond phase |
| 2 | Trotyl /RDX 60/40 (comparative example without oxygen) | 303 | 0.0 | 0.1 | (C) = 88.5% <br> (H) = 1.0% <br> (N) = 3.4% <br> (O) = 6.2% <br> (Z) = 0.9% <br> (B) = 5.1% <br> (C) = 45.3% <br> a = 0.3567 nm <br> CSR = 6.0 nm <br> S = 240 m$^2$/g <br> V$_{pore}$ = 0.85 cm$^3$/g <br> d$_{pore}$ = 7.8 nm <br> 5% of amorphous phase and 95% of diamond phase |
| 3 | Trotyl /RDX 60/40 | 304 | 0.2 | 0.15 | (C) = 86.0% <br> (H) = 0.8% <br> (N) = 3.5% <br> (O) = 5.8% <br> (Z) = 3.5% <br> (B) = 5.0% <br> (C) = 53.4% <br> a = 0.3564 nm <br> CSR = 6.0 nm <br> S = 242 m$^2$/g <br> V$_{pore}$ = 0.92 cm$^3$/g <br> d$_{pore}$ = 8.9 nm <br> 12% of amorphous pahse and 88% of diamond phase |
| 4 | Trotyl /RDX 60/40 (comparative | 305 | 6.2 | 0.5 | There is no diamond phase in the products. |

TABLE 1-continued

| Example No. 1 | Explosive 2 | Chamber t, K at detonation 3 | Content of oxygen vol. % (inert gas the balance) 4 | Concentration of suspended particles, C, kg/m³ 5 | The properties of the product obtained 6 |
|---|---|---|---|---|---|
| | | | | | example with excess oxygen) |
| 5 | Trotyl /RDX 60/40 | 303 | 0.1 | 0.15 | (C) = 85.2%<br>(H) = 1.1%<br>(N) = 5.7%<br>(O) = 5.7%<br>(Z) = 2.1%<br>(B) = 5.0%<br>(C) = 49.2%<br>a = 0.3564 nm<br>CSR = 4.6<br>S = 307 m²/g<br>$V_{pore}$ = 0.87 cm³/g<br>$d_{pore}$ = 11.5 nm<br>18% of amorphous phase and 82% of diamond phase |
| 6 | Trotyl /RDX 60/40 (comparative example with excess oxygen) | 303 | 10.1 | 0.15 | There is no carbon phase in the products. |
| 7 | Trotyl /RDX 60/40 | 333 | 0.1 | 0.1 | (C) = 88.6%<br>(H) = 0.8%<br>(N) = 2.1%<br>(O) = 5.4%<br>(Z) = 3.1%<br>(B) = 5.1%<br>(C) = 50.3%<br>a = 0.3564 nm<br>CSR = 4.8 nm<br>S = 315 m²/g<br>$V_{pore}$ = 0.99 cm³/g<br>$d_{pore}$ = 11.2 nm<br>25% of amorphous phase and 75% of diamond phase |
| 8 | Trotyl /RDX 60/40 | 335 | 1.0 | 0.14 | (C) = 89.0%<br>(H) = 0.9%<br>(N) = 1.5%<br>(O) = 3.8%<br>(Z) = 4.8%<br>(B) = 4.9%<br>(C) = 52.7%<br>a = 0.3562 nm<br>CSR = 3.8 nm<br>S = 378 m²/g<br>$V_{pore}$ = 0.65 cm³/g<br>$d_{pore}$ = 12.3 nm<br>22% of amorphous phase and 78% of diamond phase |
| 9 | Trotyl /RDX 60/40 | 332 | 5.8 | 0.12 | (C) = 87.5%<br>(H) = 1.2%<br>(N) = 2.5%<br>(O) = 6.5%<br>(Z) = 2.3%<br>(B) = 0.5%<br>(C) = 9.1%<br>a = 0.3565 nm<br>CSR = 4.1 nm<br>S = 329 m²/g<br>$V_{pore}$ = 0.76 cm³/g<br>$d_{pore}$ = 8.7 nm<br>29% of amorphous phase and 71% of diamond phase |
| 10 | Trotyl /RDX 60/40 (comparative example with excess oxygen) | 338 | 6.2 | 0.1 | There is no diamond in the products. |
| 11 | Trotyl /RDX 60/40 | 363 | 0.1 | 0.1 | (C) = 87.1%<br>(H) = 0.8%<br>(N) = 2.9%<br>(O) = 8.0%<br>(Z) = 1.2%<br>(B) = 5.1%<br>(C) = 53.6%<br>a = 0.3564 nm<br>CSR = 2.8 nm<br>S = 420 m²/g<br>$V_{pore}$ = 0.09 cm³/g<br>$d_{pore}$ = 11.6 nm<br>30% amorphous phase and 70% of diamond phase |
| 12 | Trotyl /RDX 60/40 | 361 | 1.0 | 0.15 | (C) = 88.1%<br>(H) = 0.9%<br>(N) = 2.9%<br>(O) = 5.6%<br>(Z) = 1.9%<br>(B) = 4.8%<br>(C) = 58.4%<br>a = 0.3582 nm<br>CSR = 2.9 nm<br>S = 415 m²/g<br>$V_{pore}$ = 0.83 cm³/g<br>$d_{pore}$ = 12.4 nm<br>25% of amorphous phase and 75% of diamond phase |
| 13 | Trotyl /RDX 60/40 | 362 | 3.0 | 0.15 | (C) = 88.1%<br>(H) = 1.1%<br>(N) = 1.8%<br>(O) = 7.4%<br>(Z) = 1.6%<br>(B) = 3.9%<br>(C) = 38.6%<br>a = 0.3563 nm<br>CSR = 3.0 nm<br>S = 398 m²/g<br>$V_{pore}$ = 0.64 cm³/g<br>$d_{pore}$ = 9.8 nm<br>25% of amorphous |

TABLE 1-continued

| Example No. 1 | Explosive 2 | Chamber t, K at detonation 3 | Content of oxygen vol. % (inert gas the balance) 4 | Concentration of suspended particles, C, kg/m³ 5 | The properties of the product obtained 6 |
|---|---|---|---|---|---|
| 14 | Trotyl /RDX 60/40 (comparative example with excess oxygen) | 363 | 6.5 | 0.1 | phase and 75% of diamond phase There is no diamond in the explosion products. |
| 15 | Trotyl /RDX 60/40 | 363 | 6.0 | 0.05 | (C) = 87.3% (H) = 0.9% (N) = 1.5% (O) = 10.3% (Z) = 2.5% (B) = 3.1% (C) = 25.1% a = 0.3564 nm CSR = 3.5 nm S = 408 m²/g $V_{pore}$ = 1.0 cm³/g $d_{pore}$ = 11.2 nm 12% of amorphous phase and 88% of diamond phase |
| 16 | Trotyl /RDX 60/40 | 361 | 4.5 | 0.02 | (C) = 89.7% (H) = 1.4% (N) = 1.8% (O) = 7.1% (Z) = 2.1% (B) = 3.6% (C) = 32.1% a = 0.3565 nm CSR = 4.6 nm S = 423 m²/g $V_{pore}$ = 0.98 cm³/g $d_{pore}$ = 12.4 nm 10% of amorphous phase and 90% of diamond phase |
| 17 | Trotyl /RDX 60/40 (comparative example with deficient oxygen) | 303 | 0.006 | 0.01 | (C) = 88.9% (Z) = 1.4% (N) = 3.5% (O) = 6.2% (Z) = 3.0% (B) = 4.5% (C) = 43.7% a = 0.3568 nm CSR = 5.2 nm S = 358 m²/g $V_{pore}$ = 1.0 cm³/g $d_{pore}$ = 11.4 nm 25% of amorphous phase and 75% of a diamond phase |
| 18 | Trotyl /RDX 60/40 | 305 | 2.5 | 0.005 | (C) = 90.1% (H) = 1.1% (N) = 2.1% (O) = 6.7% (Z) = 2.5% (B) = 2.5% (C) = 34.6% a = 0.3567 nm CSR = 3.9 nm S = 401 m²/g $V_{pore}$ = 0.95 cm³/g $d_{pore}$ = 10.5 nm 5% of amorphous phase and 95% of diamond phase |

Practically any carbon-containing explosive with a negative oxygen balance, such as octogen (cyclotetramethylenetetranitramine ("HMX")), trinitrotriaminebenzene, mixtures of trotyl/RDX SG/50 and trotyl/RDX 70/30 and the like, can be used as an explosive in the process of the present invention with the same result as to the properties of the end product and under the same conditions.

The present diamond-bearing material is suggested for use as a component of composite materials in the form of an additive considerably improving the wear-resistance of assemblies, their reliability and life time, and also as a material for gas-liquid chromatography.

Thus, for example, introduction of the claimed material into lubricating oil I-40A in the amount 0.1% by mass makes it possible to reduce the coefficient of friction in plain s bearings by a factor of 1.5 ... 1.8, the rate of wear of friction pairs by a factor of 6 to 10, allows increasing the ultimate loads on a friction assembly by a factor of 1.5 to 7.0 and decreasing the volume temperature in the zone of friction as against the lubricating oils containing no such additive.

Introduction of the material according to the present invention into a universal chromium electrolyte with the concentration 8 to 15 g/l and conducting chromium deposition at the bath temperature 323 to 328 K and current density 40 to 60 A/dm² give chromium coating applied on to a tool for material working, featuring the following efficiency.

TABLE 2

| Tool | Increase in durability, times (as compared with tools and machine parts having no coating based on the material of the invention) |
|---|---|
| Dies for cold drawings of metals | 2 ... 5 |
| Press-tool for powder metallurgy | 10 |
| Die tool | 1.5 ... 4.0 |
| Dental drills | 8 ... 12 |
| Cutting tools for glass-reinforced plastic | 3 ... 10 |
| Shafts, machine and mechanism gear wheel | 2 ... 3 |

The particular increase in durability values of a tool depends on the properties of the material being processed and the conditions of processing.

The material of the present invention can also be used in chromatography.

The process of production of ultradispersive diamond is carried out on commercial scale.

What is claimed is:

1. In a synthetic diamond-bearing material consisting essentially of aggregates of particles of a round or irregular shape, with an average diameter of the particles not exceeding 0.1μ, the improvement wherein the material comprises:

a) elemental composition (% by mass):

|  |  |
   | --- | --- |
   | carbon | 75 to 90, |
   | hydrogen | 0.8 to 1.5, |
   | nitrogen | 0.6 to 4.5, |
   | oxygen the balance; | | b) phase composition (% by mass):
      amorphous carbon 10 to 30, diamond of cubic crystal structure the balance;
   c) a porous structure said material having pores with a volume of the pores being within about 0.6 to 1.0 $cm^3/g$;
   d) a material surface with 10 to 20% of the material surface being methyl, nitrile, first and second hydroxyl groups having different chemical shifts in an NMR spectrum and one or more oxycarboxylic functional groups selected from the group consisting of carbonyl groups, carboxyl groups, guinone groups, hydroperoxide groups and lactone groups 1 to 2% of the material surface being occupied by carbon atoms with uncompensated bonds; and
   e) a specific surface area in a range of from 200 to 450 $gM^2/g$.

2. A synthetic diamond bearing material according to claim 1, wherein a diameter of the pores is within 7.5 to 12.5 nm.

3. A synthetic diamond-bearing material according to claim 1, wherein the material has a crystal lattice parameter of 0.3562±0.0004 nm.

4. A diamond-bearing material as claimed in claim 1 prepared by a process consisting essentially of detonating in a closed space a charge consisting essentially of a carbon-containing explosive or mixture of explosives having a negative oxygen balance, the detonation of the charge being initiated in the presence of carbon particles in a concentration of about 0.01 to 0.15 $kg/m^3$ in a medium consisting essentially of about 0.1 to 6% by volume oxygen and a balance of gases inert to carbon at a temperature of about 303 to 363 K.

5. A diamond-bearing material as claimed in claim 3 prepared by a process consisting essentially of detonating, in a closed space, a charge consisting essentially of a carbon-containing explosive or mixture of explosives having a negative oxygen balance the detonation of the charge being initiated in the presence of carbon particles in a concentration of about 0.01 to 0.15 $kg/m^3$ in a medium consisting essentially of about 0.1 to 6% by volume oxygen and a balance of gases inert to carbon at a temperature of about 303° to 363° K.

6. A process for preparing a synthetic diamond-bearing material consisting essentially of:

(a) providing a pressure vessel with (i) a charge consisting essentially of at least one carbon-containing solid explosive or mixture of carbon-containing solid explosives, said charge having a negative oxygen balance, and (ii) a medium consisting essentially of gases and carbon particles ultra dispersed as a suspension in the gases in a concentration of about 0.01 to 0.15 $kg/m^3$, said gases consisting essentially of oxygen in an amount of about 0.1 to 6% by volume and a balance of nitrogen or gases inert to carbon;

(b) closing the pressure vessel and detonating the charge, the detonating of the charge being initiated at a temperature of about 303° to 363° K in the absence from the charge of a carbon material other than the carbon-containing explosive or mixture of explosives to form the synthetic diamond-bearing material from decomposition products of the explosive or mixture of explosives and not from the carbon particles in the medium; and (c) recovering the synthetic diamond-bearing material.

7. A process as claimed in claim 6, wherein the explosive or explosives are selected from the group consisting of HMX, trinitrotriaminebenzene, RDX and mixtures of RDX and trotyl.

* * * * *